(12) United States Patent
Chodieva

(10) Patent No.: US 11,206,909 B2
(45) Date of Patent: Dec. 28, 2021

(54) SMART PHONE CASE WITH MAKE-UP COMPONENT

(71) Applicant: Nafissa Chodieva, London (GB)

(72) Inventor: Nafissa Chodieva, London (GB)

( * ) Notice: Subject to any disclaimer, the term of this patent is extended or adjusted under 35 U.S.C. 154(b) by 396 days.

(21) Appl. No.: 15/764,639

(22) PCT Filed: Sep. 28, 2016

(86) PCT No.: PCT/GB2016/053019
§ 371 (c)(1),
(2) Date: Mar. 29, 2018

(87) PCT Pub. No.: WO2017/055840
PCT Pub. Date: Apr. 6, 2017

(65) Prior Publication Data
US 2018/0271252 A1 Sep. 27, 2018

(30) Foreign Application Priority Data

Sep. 29, 2015 (GB) .................................. 1517189
May 20, 2016 (GB) .................................. 1608925

(51) Int. Cl.
*A45D 33/26* (2006.01)
*A45D 40/18* (2006.01)
*A45D 40/24* (2006.01)
*H04M 1/18* (2006.01)
*H04M 1/21* (2006.01)
(Continued)

(52) U.S. Cl.
CPC .............. *A45D 33/26* (2013.01); *A45C 11/00* (2013.01); *A45D 33/20* (2013.01); *A45D 40/18* (2013.01); *A45D 40/24* (2013.01); *H04M 1/185* (2013.01); *H04M 1/21* (2013.01); *A45C 11/008* (2013.01); *A45C 15/00* (2013.01); *A45C 2011/002* (2013.01); *H04M 1/0235* (2013.01); *H04M 2250/52* (2013.01)

(58) Field of Classification Search
CPC ........ A45D 33/26; A45D 33/20; A45D 40/24; A45D 40/18; A45C 11/008; A45C 11/00; A45C 2011/002; H04M 1/21
See application file for complete search history.

(56) References Cited

U.S. PATENT DOCUMENTS 1,698,266 A * 1/1929 Kirby .................. A45D 33/006
132/287
4,526,273 A * 7/1985 Tsuji .................... A45D 33/006
132/286
(Continued)

*Primary Examiner* — Cris L. Rodriguez
*Assistant Examiner* — Brianne E Kalach
(74) *Attorney, Agent, or Firm* — Bay State IP, LLC

(57) ABSTRACT

According to the invention there is provided a smart phone case (1) having formations to hold a smart phone in the case, a back (9) from which the formations extend forwards, an open or openable front for the display of the smart phone and an openable make-up compartment (8) connected to the case. The openable make-compartment (8) is arranged to be behind the smart phone when closed, the compartment having at least one forwards facing make-up receptacle (11), the compartment when open facing in the same direction as the display and presenting make-up for the user's use in the or each receptacle. When the compartment (8) is open the user can use the screen side camera of the smart phone to display her photograph as she applies make-up.

6 Claims, 5 Drawing Sheets

(51) Int. Cl.
  *A45D 33/20*   (2006.01)
  *A45C 11/00*   (2006.01)
  *H04M 1/02*    (2006.01)
  *A45C 15/00*   (2006.01)

(56) References Cited

U.S. PATENT DOCUMENTS

| | | | | |
|---|---|---|---|---|
| 5,353,947 | A * | 10/1994 | Zinnbauer | A45D 40/22 |
| | | | | 206/581 |
| 7,146,184 | B1 * | 12/2006 | Tsitsiashvili | A45C 15/04 |
| | | | | 455/550.1 |
| 8,286,646 | B2 * | 10/2012 | Son | A45C 11/008 |
| | | | | 132/287 |
| 8,602,039 | B1 * | 12/2013 | Gindi | H04M 1/0247 |
| | | | | 132/315 |
| 8,833,379 | B1 * | 9/2014 | Kaplan | A45D 33/26 |
| | | | | 132/287 |
| D724,785 | S * | 3/2015 | Frederick | D28/77 |
| 2003/0000865 | A1 * | 1/2003 | Carlino | H04M 1/21 |
| | | | | 206/581 |
| 2011/0077061 | A1 * | 3/2011 | Danze | H04M 1/185 |
| | | | | 455/575.1 |
| 2011/0089078 | A1 | 4/2011 | Ziemba | |
| 2013/0069499 | A1 * | 3/2013 | Modrell | G06F 1/1656 |
| | | | | 312/223.1 |
| 2013/0199948 | A1 * | 8/2013 | Lebauer | A45C 11/00 |
| | | | | 206/216 |
| 2014/0251368 | A1 * | 9/2014 | Lawson | A45C 13/02 |
| | | | | 132/287 |
| 2015/0244407 | A1 * | 8/2015 | Peral | H04B 1/3888 |
| | | | | 455/575.8 |
| 2017/0354229 | A1 * | 12/2017 | Berkley | A45C 13/005 |

* cited by examiner

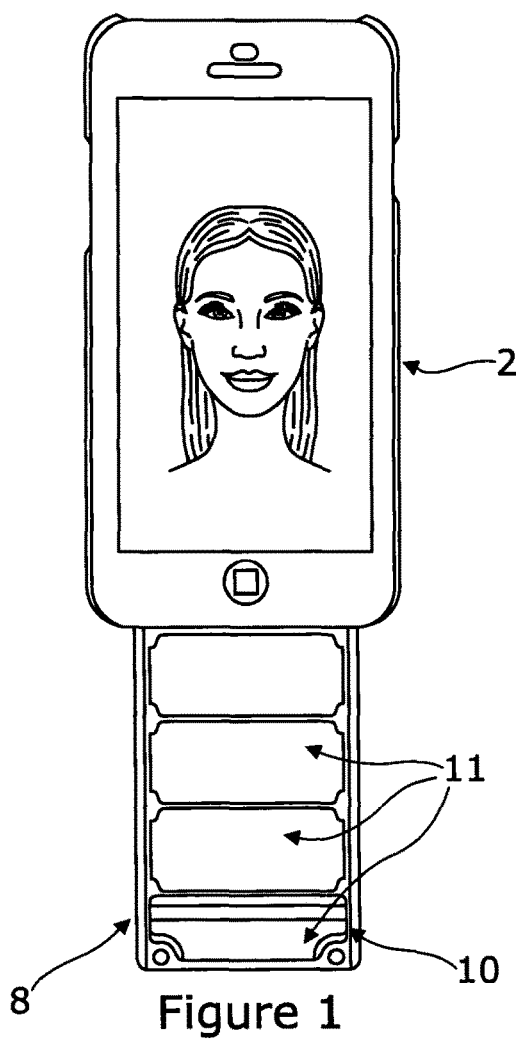
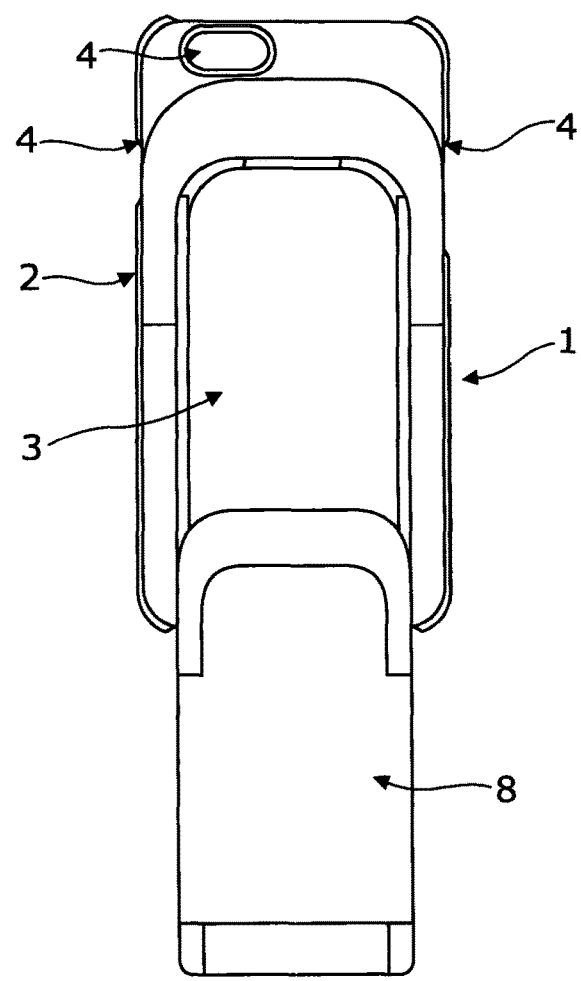
Figure 1
Figure 2
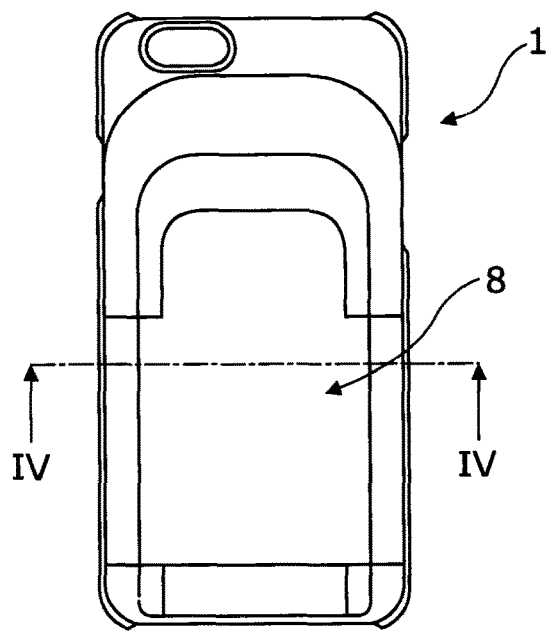
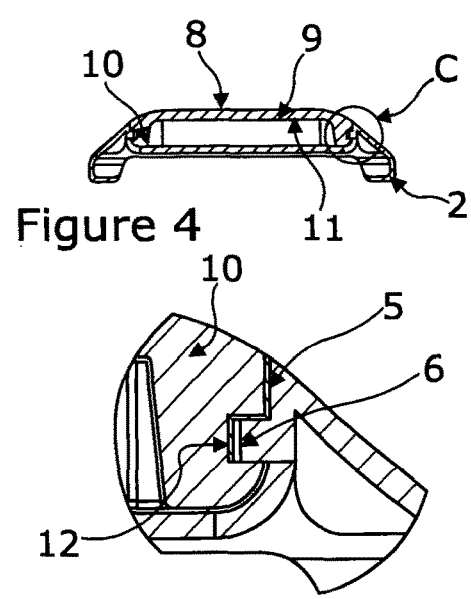
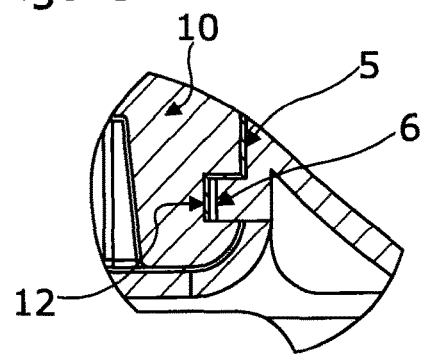
Figure 3
Figure 4
Figure 5  DETAIL C

SMART PHONE CASE WITH MAKE-UP COMPONENT

CROSS REFERENCE TO RELATED APPLICATION

This application is for entry into the U.S. National Phase under § 371 for International Application No. PCT/GB2016/053019 having an international filing date of Sep. 28, 2016, and from which priority is claimed under all applicable sections of Title 35 of the United States Code including, but not limited to, Sections 120, 363, and 365(c), and which in turn claims priority under 35 USC 119 to Great Britain Patent Application No. 1517189.5 filed on Sep. 29, 2015 and Great Britain Patent Application No. 1608925.2 filed on May 20, 2016.

The present invention relates to a smart phone case.

It is known to provide ladies' make up materials (hereinafter "make-up") in a smart phone case.

The object of the present invention is to provide an improved make-up containing smart phone case.

According to the invention there is provided a
smart phone case having:
formations to hold a smart phone in the case,
a back from which the formations extend forwards,
an open or openable front for the display of the smart phone and
an openable make-up compartment connected to the case to be behind the smart phone when closed, the compartment having at least one forwards facing make-up receptacle, the compartment when open facing in the same direction as the display and presenting make-up for the user's use in the or each receptacle,
whereby the user can use the screen side camera of the smart phone to display her photograph as she applies make-up.

Whilst the compartment could be arranged to pivot from a corner of the case to expose the make-up, preferably it is slidable to one side or one end of the case.

Conveniently the compartment has receptacles for more than one make-up material such as more than one colour of lip paint and a lip paint brush.

Normally the case will have a wall between the back of the smart phone and the compartment and its receptacles.

According to a second embodiment of the invention there is provided a smart phone case having an open or openable front for the display of the smart phone, it has a main moulding consisting of a back with formations extending from it and a downward slide able rear compartment made up of a carrier and a rear cover. The carrier and cover slide together to expose make up receptacles when in an open position. The carrier when open is facing in the same direction as the display and presents the make-up at an open side of the carrier, the rear case closing the other side of the carrier. When the carrier is in an open position the user can use the screen side camera to display their photograph as they apply make-up. The rear case can be disconnected from the carrier to allow removal of the make-up receptacles to refill or replace the contents.

To help understanding of the invention, a specific embodiment thereof will now be described by way of example and with reference to the accompanying drawings, in which:

FIG. 1 is front view of smart phone case with an open compartment in accordance with the invention, the case having a smart phone fitted and being used in "selfie" camera mode as a mirror;

FIG. 2 is a rear view of the open case of FIG. 1;

FIG. 3 is a similar rear view of the case of FIG. 1 when closed;

FIG. 4 is a cross-sectional view on the line IV-IV in FIG. 3;

FIG. 5 is a scrap view at the circle C in FIG. 4;

Figure 6:
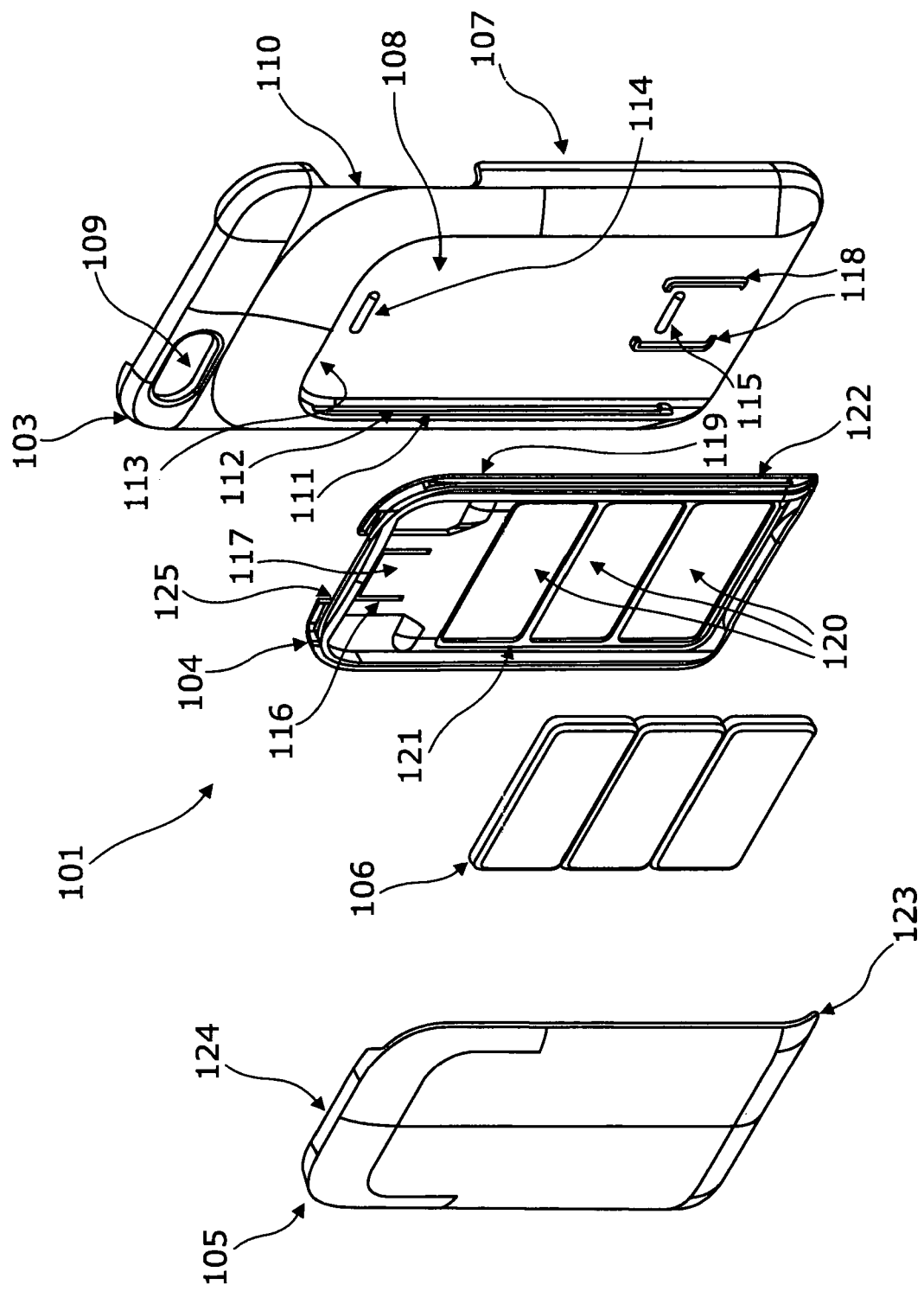
FIG. 6 is an exploded isometric view of another case in accordance with the invention.

Referring to the drawings, a smart phone case 1 has resilient sidewalls 2 and a back wall 3, with camera and control apertures 4. Downwards of the camera aperture, the side walls blend out to a thickening of the case, with inwards facing guides 5 and ribs 6 along the sides of the case. The guides are joined by a similar formation 7, without a rib, from side to side close to the main camera aperture, but not at the end remote from the camera.

A compartment 8 with a further back wall 9, peripheral walls 10 and forward facing receptacles 11. The peripheral walls at the side of the compartment have grooves complementary to the ribs, whereby the compartment can be slid in to extend only within the extent of the sidewalls 2 or slid out to expose the compartments. In this configuration, lip gloss for instance in the compartments can be applied with a brush in an end one of the compartments, using the smart phone camera in "selfie" mode as a mirror.

As shown the compartment has a plain back wall 9 which is expected to provide enough friction for sliding out of the panel. However it can be ribbed or otherwise formed to enhance friction in its manual sliding out for use.

Figure 7:
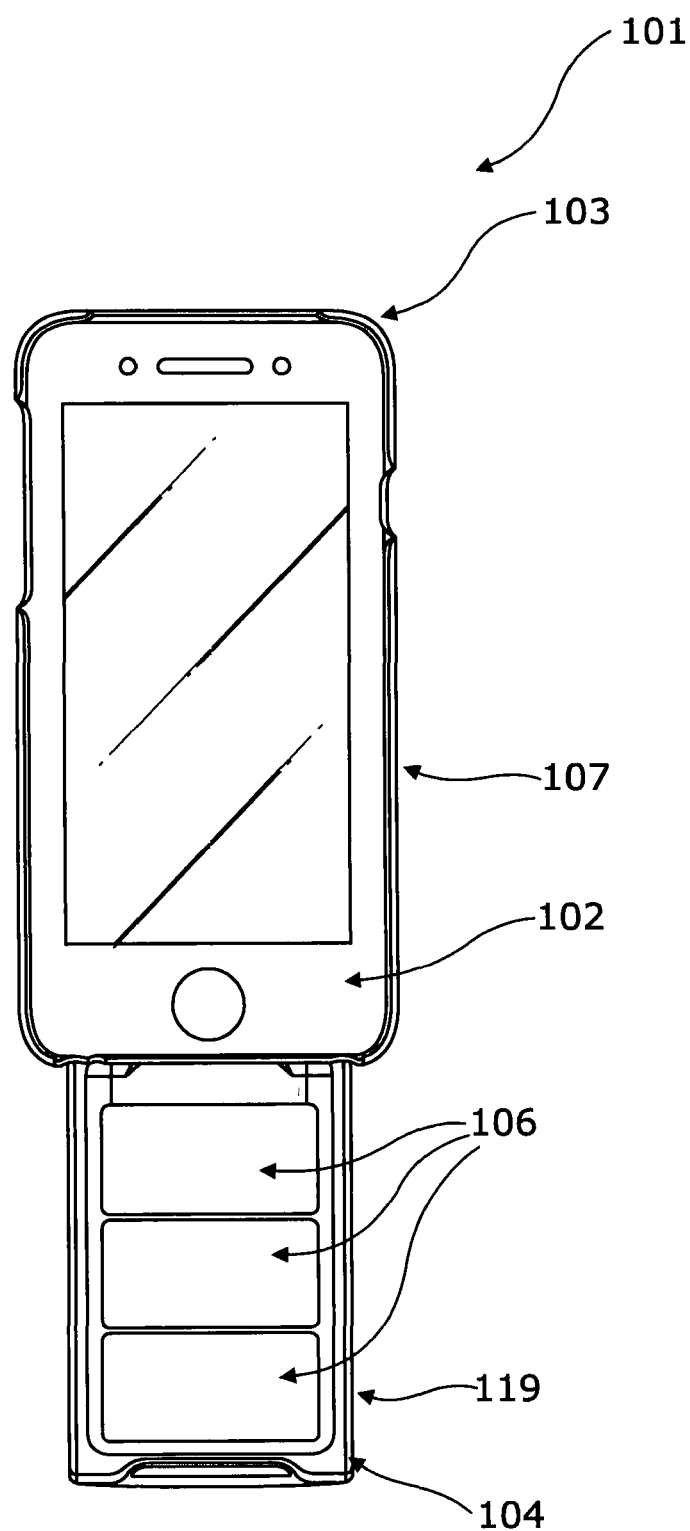
FIG. 7 is a front view of the open case of FIG. 6.
Figure 8:
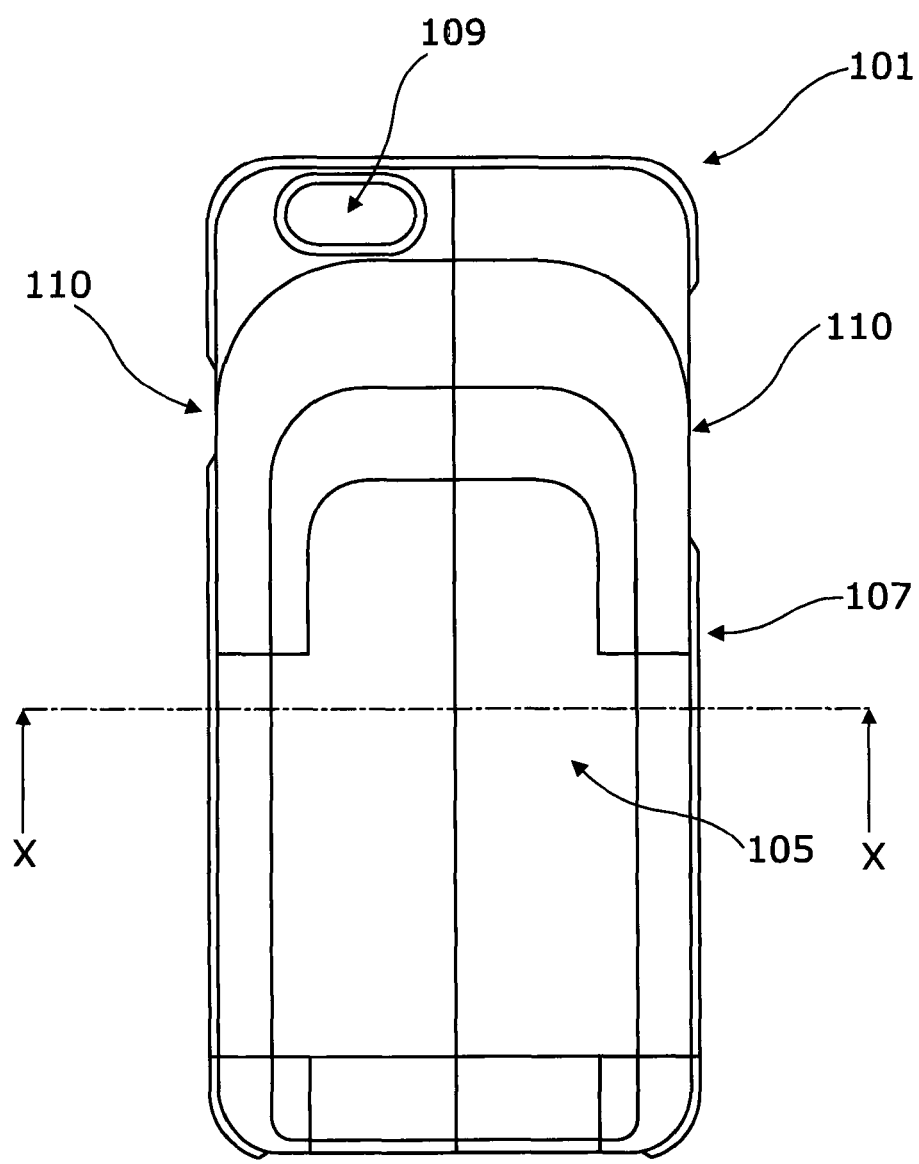
FIG. 8 is a rear view of the case of FIG. 6 when closed.
Figure 9:
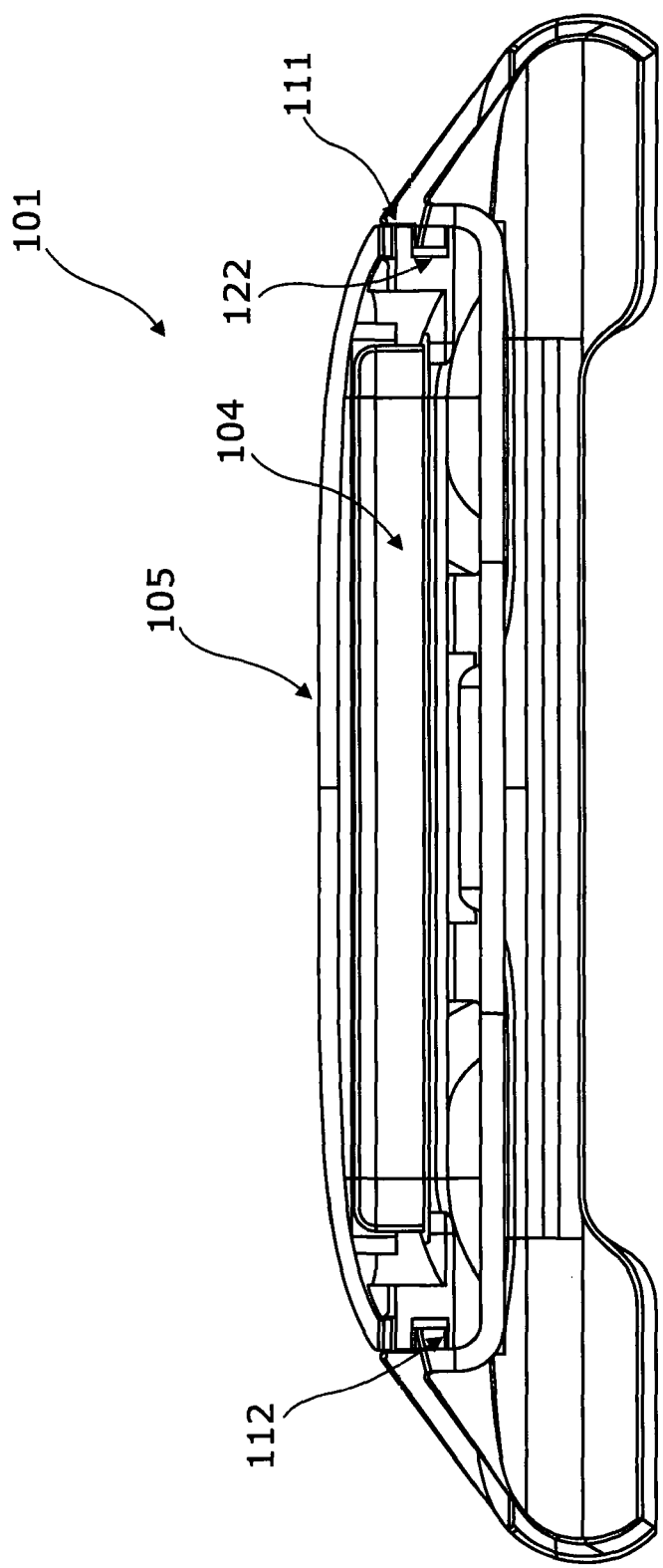
FIG. 9 is a cross sectional view on the line X-X in FIG. 8.

Turning to FIGS. 6-9, a further embodiment is shown, in which there is a smart phone case 101 with an open front for display of a smart phone 102, it has a main moulding 103 consisting of a back with formations extending from it and a downward slide able rear compartment made up of a carrier 104 and a rear cover 105. The carrier 104 and cover 105 slide together to expose make up receptacles 106 on the display side of the smart phone. When the make-up receptacles 106 are exposed make-up can be applied using the smart phone in "selfie mode".

The main moulding 103 has resilient sidewalls 107, an internal wall 108, an aperture for the camera 109 and apertures for the controls 110. Downwards of the camera aperture 109, the side walls 107 blend out to a thickening of the moulding, with inwards facing guides 111 and ribs 112. The guides are joined by a similar formation 113, without a rib, from side to side at the top of the internal wall, but not at the bottom end of the internal wall.

The internal wall 108 has a top ridge 114 and a bottom ridge 115 which engage with a cut out 116 holding the carrier in place at its open and closed positions. To enable sliding from the open and closed positions, there is a flap 117 partially enclosed by the cut out 116. When a sliding force is applied the flap 117 flexes and the carrier can pass over the ridge. To prevent the carrier 104 being able to slide past the bottom ridge 115 even when the flap 117 is flexed there are two stops 118.

The carrier 104, has peripheral walls 119, receptacle apertures 120 and a recess 121. The peripheral walls 119 at the side of the carrier have grooves 122 complementary to the ribs 112 of the main moulding to facilitate sliding. The make-up receptacles 106 are shaped to sit within the recess 121 to be accessed through the receptacle apertures 120 when the rear cover is connected and the carrier is in an open position.

The rear cover 105 has a curved bottom end 123 and a lip 124. The lip 124 fits in a recess 125 of the carrier connecting the rear cover and carrier. The rear cover can be disconnected from the carrier to allow removal of the make-up receptacles to refill or replace the contents.

As shown the rear cover 105 is plain which is expected to provide enough friction for sliding the rear part from the main moulding 103. However it can be ribbed or otherwise formed to enhance friction in its manual sliding out for use.

The invention is not intended to be restricted to the details of the above described embodiment. For instance the case may be provided with a hinged front for enclosing the front of the smart phone.

The invention claimed is:

1. A smart phone case having:
   formations to hold a smart phone in the case,
   a back wall from which the formations extend forwards,
   an open or openable front for a smart phone,
   two guides outwards of the back wall at respective sides thereof,
   two spaced, engagement ridges extending rearwards of the back wall, and
   an openable make-up compartment connected to the case by the guides to be behind the smart phone when closed, having:
      two side guides at the edges of said compartment, the two side guides being respectively complementary to the two guides for sliding of said compartment to one end of the case for opening,
      a flap formation with cut-outs at each side, the flap formation being engageable with the one of the engagement ridges when said compartment is closed and the other when open and
      at least one forwards facing make-up receptacle,
      the compartment when open is facing in the same direction as the smart phone and presenting a make-up at an open side of the compartment for a user's use in the or each receptacle,
   the compartment being made up of a carrier and an exposed rear cover, with the carrier and the rear cover being moveable as one part when opening to present the makeup,
   whereby the user can use a screen side camera of the smart phone to display a photograph as they apply make-up.

2. A smart phone case as claimed in claim 1 wherein stops are provided at a lower one of the engagement ridges.

3. A smart phone case as claimed in claim 1, including an upper, outwards-extending, formation on the back wall between the two guides and a complementary formation of said compartment abutting the upper, outwards-extending, formation when the compartment is closed.

4. A smart phone case as claimed in claim 1, wherein the compartment has a plurality of receptacles for more than one make-up material.

5. A smart phone case as claimed in claim 1, wherein the compartment has an additional receptacle for a make-up applicator.

6. A smart phone case as claimed in claim 1, wherein the rear cover is disconnectable from the carrier to allow removal of the make-up receptacles for refilling or replacement of make-up contents.

* * * * *